(12) United States Patent
Kimura et al.

(10) Patent No.: US 8,470,200 B2
(45) Date of Patent: *Jun. 25, 2013

(54) PRODUCTION PROCESS OF LONG-LASTING PHOSPHOR

(75) Inventors: Yuji Kimura, Tokyo (JP); Yasushi Takai, Tokyo (JP); Hirofumi Kawazoe, Tokyo (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/997,756

(22) PCT Filed: Jul. 13, 2009

(86) PCT No.: PCT/JP2009/062695
§ 371 (c)(1),
(2), (4) Date: Dec. 13, 2010

(87) PCT Pub. No.: WO2010/007970
PCT Pub. Date: Jan. 21, 2010

(65) Prior Publication Data
US 2011/0101274 A1 May 5, 2011

(30) Foreign Application Priority Data
Jul. 14, 2008 (JP) .................. 2008-182670

(51) Int. Cl.
*C09K 11/08* (2006.01)

(52) U.S. Cl.
USPC .................................. 252/301.4 R

(58) Field of Classification Search
USPC ...... 252/301.4 R, 301.4 H, 301.4 F; 423/275; 264/37.29; 518/708; 588/261, 901
See application file for complete search history.

(56) References Cited

U.S. PATENT DOCUMENTS

| 3,864,273 A | * | 2/1975 | Forbes et al. | .......... 252/301.4 R |
| 5,424,006 A | | 6/1995 | Murayama et al. | |
| 5,853,614 A | | 12/1998 | Hao et al. | |
| 2003/0183807 A1 | * | 10/2003 | Shankar et al. | ........ 252/301.4 R |
| 2004/0043692 A1 | * | 3/2004 | Kawamura et al. | ............. 445/24 |
| 2008/0205477 A1 | * | 8/2008 | Hama et al. | ..................... 372/98 |
| 2008/0308828 A1 | * | 12/2008 | Kashiwagi et al. | ............. 257/98 |

FOREIGN PATENT DOCUMENTS

| CN | 101200638 A | * | 6/2008 |
| JP | 07-011250 | | 1/1995 |
| JP | 09-013028 | | 1/1997 |
| JP | 09-059617 | | 3/1997 |
| JP | 09-095671 | | 4/1997 |
| JP | 10-231480 | | 9/1998 |
| JP | 11102644 A | * | 4/1999 |
| JP | 2003-147352 | | 5/2003 |
| JP | 2003-238949 | | 8/2003 |
| JP | 2004-262978 | | 9/2004 |
| JP | 2004-352900 | | 12/2004 |
| WO | WO 2010/007970 | | 1/2010 |

OTHER PUBLICATIONS

Machine translation of JP11102644A.*
Translation of CN 101200638 A (abstract only).*
Machine translation of JP 11102644A.*
International Search Report corresponding to International Application No. PCT/JP2009/062695 mailed Aug. 18, 2009.
International Search Report corresponding to International Application No. PCT/JP2010/053037 mailed May 18, 2010.

* cited by examiner

*Primary Examiner* — Emily Le
*Assistant Examiner* — Lynne Edmondson
(74) *Attorney, Agent, or Firm* — Myers Bigel Sibley & Sajovec, P.A.

(57) ABSTRACT

The present invention provides a production process for the production of an $MAl_2O_4$:Eu type long-lasting phosphor (M representing an alkaline earth metal). The process includes the steps of mixing a BAM (alkaline earth aluminate) phosphor with an alkaline earth compound and calcinating the resulting mixture.

8 Claims, No Drawings

PRODUCTION PROCESS OF LONG-LASTING PHOSPHOR

RELATED APPLICATIONS

This application is a 35 U.S.C. §371 national stage application of PCT Application No. PCT/JP2009/062695, filed on Jul. 13, 2009, which claims priority from Japanese Application No. 2008-182670 filed Jul. 14, 2008, the contents of which are incorporated herein by reference in their entireties. The above-referenced PCT International Application was published as International Publication No. WO 2010/007970 A1 on Jan. 21, 2010.

TECHNICAL FIELD

The present invention relates to a low-cost production process of a long-lasting phosphor to be used in escape route signs and the like.

BACKGROUND ART

The demand for long-lasting phosphors, which can be used for e.g. escape route signs, has been increasing due to widening of its applications since an $MAl_2O_4$:Eu type long-lasting phosphor (M representing an alkaline earth element) was developed (refer to, for example, Patent Document 1) by NEMOTO & CO., LTD in 1993. However, materials used for the production thereof are expensive and a production cost is relatively high so that they are sold at a high price and has not yet become widely used.

Patent Document 1: JP2,543,825B

SUMMARY OF THE INVENTION

Problems to be Solved by the Invention $MAl_2O_4$:Eu type long-lasting phosphors are produced at a high cost because europium, which is an expensive rare earth element, is used as a raw material and in addition, expensive and high-purity fine-grain type aluminum oxide, alkaline earth carbonate, rare earth oxide, and the like are necessary for obtaining phosphors having a uniform composition. It is therefore difficult to produce low-cost products.

With the foregoing in view, it is an object of the present invention to provide a production process of an $MAl_2O_4$:Eu type long-lasting phosphor that can be performed at a reduced raw material cost.

Means for Solving the Problems

With a view to overcoming the problem described above, the present inventors have found that a long-lasting phosphor can be produced by mixing the recycle waste of BAM phosphors with an alkaline earth compound and/or a rare earth compound and then calcinating the resulting mixture in view of the fact that the recycle waste of BAM phosphors, which have been used as blue-emitting (or green-emitting) phosphors for fluorescent lamps, plasma television displays, or liquid-crystal backlights, may become a matrix of an alkaline earth aluminate having a high alumina content and may contain an abundant amount of europium. This has lead to the completion of the present invention.

The gist of the present invention may reside in a low-cost production process of a long-lasting phosphor by mixing a BAM phosphor with an alkaline earth compound and/or a rare earth compound and then calcinating the resulting mixture.

Effect of the Invention

According to the present invention, a long-lasting phosphor can be produced at a very low cost without expensive europium as a raw material by mixing a BAM phosphor contained in the phosphor waste with an alkaline earth compound and/or a rare earth compound and calcinating the resulting mixture. The low-cost production of the long-lasting phosphor would increase its application fields so that this process is of great value.

MODE FOR CARRYING OUT THE INVENTION

The present invention will hereinafter be described specifically.

<Composition of Raw Materials>

The alkaline earth aluminate (commonly called BAM) serving as a raw material in the present invention is an alkaline earth aluminate phosphor having a composition formula represented by:

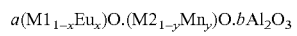

$$a(M1_{1-x}Eu_x)O \cdot (M2_{1-y}Mn_y)O \cdot bAl_2O_3$$

(wherein, M1 represents at least one element selected from Ba, Sr, and Ca, preferably Ba; M2 represents Mg; and a, b, x, and y represent numbers satisfying the following conditions: $0.8 \leq a \leq 1.2$, $4.5 \leq b \leq 8.5$, $0.05 \leq x \leq 0.3$, and respectively).

The composition of each element of the alkaline earth aluminate phosphor is a value determined by X-ray fluorescence (XRF) analysis.

The term "alkaline earth compound" as used in the present invention means a compound, among compounds of an element selected from Mg, Ca, Sr, and Ba or a mixture of two or more elements selected therefrom, capable of being oxidized by a calcinating step described later; or just an oxide of the element or the mixture of two or more elements.

The term "rare earth compound" as used in the present invention means a compound, among compounds of an element selected from La, Ce, Pr, Nd, Sm, Gd, Tb, Dy, Ho, Er, Tm, Yb, and Lu or a mixture of two or more elements selected therefrom, capable of being oxidized by a calcinating step described later; or just an oxide of the element or the mixture of two or more elements.

The BAM phosphor to be used in the present invention, is preferably recycle waste of BAM phosphors used as a blue-emitting or green-emitting phosphor in fluorescent lamps, plasma television displays, and liquid-crystal display backlights, waste generated in the coating step or washing step of BAM phosphors, or BAM phosphors not meeting specifications.

The origin of the BAM phosphor to be used in the present invention is, in most cases, a waste mixture with another phosphor such as $Y_2O_3$:Eu (red) or $LaPO_4$:CeTb (green). With regards to the phosphors other than BAM, a recycling process of each element, which has been dissolved by using acid decomposition or the like treatment, has already been established. Although JP2004-352900A proposes a process of collecting even BAM phosphors having a markedly low solubility, the phosphors undergo significant deterioration in brightness during their collecting step. As a result, this process has not yet been industrialized and the BAM phosphors are not reused but discarded as a residue currently.

The BAM phosphor residue separated and collected from the recycle waste of phosphors can be a cost-free raw material.

The manufacturing process of the present invention comprises a mixing step of raw materials and a calcinating step of the resulting mixture.

First, in the mixing step, powder mixing of a BAM (alkaline earth aluminate) phosphor and an alkaline earth compound or a BAM phosphor, an alkaline earth compound, and a rare earth compound in a ball mill or the like can be selected.

Raw material powders used for the powder mixing have preferably an average particle size of from 0.3 to 30 μm as measured using an FRA measuring instrument (product of Micro-trak Systems) with a laser diffraction/scattering method as a measuring principle. When the average particle size is less than 0.3 μm, powders cannot be dispersed uniformly in the mixing step because of firm agglomeration of the powders. A phosphor thus obtained may be an inhomogeneous phosphor with poor afterglow characteristics. When the average particle size exceeds 30 μm, on the other hand, the reaction between raw material powders does not proceed sufficiently and a phosphor thus obtained may be an inhomogeneous phosphor with poor afterglow characteristics.

As the alkaline earth compound or rare earth compound, compounds such as carbonates, oxides, hydroxides, and acetates may be used insofar as they may be an oxide by a calcinating step which will be described later.

The following compounds are specific examples of them.

Examples of the alkaline earth compounds may include magnesium carbonate ($MgCO_3$), calcium carbonate ($CaCO_3$), strontium carbonate ($SrCO_3$), barium carbonate ($BaCO_3$), magnesium oxide (MgO), calcium oxide (CaO), strontium oxide (SrO), barium oxide (BaO), magnesium hydroxide ($Mg(OH)_2$), calcium hydroxide ($Ca(OH)_2$), strontium hydroxide ($Sr(OH)_2$), barium hydroxide ($Ba(OH)_2$), magnesium acetate ($Mg(CH_3COO)_2 \cdot 4H_2O$), calcium acetate ($Ca(CH_3COO)_2 \cdot H_2O$), strontium acetate ($Sr(CH_3COO)_2 \cdot 0.5H_2O$), and barium acetate ($Ba(CH_3COO)_2$);

Examples of the rare earth compounds include lanthanum carbonate ($La_2(CO_3)_3 \cdot 8H_2O$), neodymium carbonate ($Nd_2(CO_3)_3 \cdot 8H_2O$), samarium carbonate ($Sm_2(CO_3)_3 \cdot 4H_2O$), dysprosium carbonate ($Dy_2(CO_3)_3 \cdot 4H_2O$), basic lanthanum carbonate ($LaOHCO_3 \cdot 8H_2O$), basic neodymium carbonate ($NdOHCO_3$), basic samarium carbonate ($SmOHCO_3$), basic dysprosium carbonate ($DyOHCO_3$), lanthanum oxide ($La_2O_3$), neodymium oxide ($Nd_2O_3$), samarium oxide ($Sm_2O_3$), dysprosium oxide ($Dy_2O_3$), lanthanum hydroxide ($La(OH)_3$), neodymium hydroxide ($Nd(OH)_3$), samarium hydroxide ($Sm(OH)_3$), dysprosium hydroxide ($Dy(OH)_3$), lanthanum acetate ($La(CH_3COO)_3 \cdot 1.5H_2O$), neodymium acetate ($Nd(CH_3COO)_3 \cdot H_2O$), samarium acetate ($Sm(CH_3COO)_3 \cdot 4H_2O$), and dysprosium acetate ($Dy(CH_3COO)_3 \cdot 4H_2O$).

The alkaline earth compound is added preferably in an amount to give a final composition of $MAl_2O_4$ (an amount to give a molar ratio of the total amount of alkaline earth metal elements to the amount of aluminum of 1:2). Lasting brightness can however be observed even if there is some difference in the composition. The alkaline earth compound and the rare earth compound are added, for example, in an amount of from 2 to 4 mol and from 0 to 1 mol (from 0.001 to 1 mol particularly when the rare earth element is added), respectively, per mol of the BAM phosphor (represented by the above composition formula) to give a composition of M-(Mn)$Al_2O_4$:Eu or M-(Mn)$Al_2O_4$:Eu,RE (the rare earth element to be added is an element selected from La, Ce, Pr, Nd, Sm, Gd, Tb, Dy, Ho, Er, Tm, Yb, Lu, or Y, or a mixture of two or more thereof, preferably La, Nd, Sm or Dy, or a mixture of two or more thereof, while the alkaline earth element to be added is an element selected from Mg, Ca, Sr, or Ba or a mixture of two or more thereof, preferably Ca or Sr, or a mixture of two or more thereof).

Addition of a small amount (for example, 10 mol % or less of the total amount of the alkaline earth metals) of a flux such as boric acid or boron oxide upon mixing of the raw materials is effective for uniform progress of the reaction, leading to the improvement of afterglow characteristics.

The calcinating step in the present invention may be performed in a reducing atmosphere (for example, in a mixed gas atmosphere of nitrogen and hydrogen) or an inert gas atmosphere (for example, a nitrogen or argon atmosphere) (at from 1000 to 1500° C.). Calcination in an oxidizing atmosphere such as air may oxidize a part of divalent Eu, which is an emission center, into trivalent Eu and deteriorate afterglow characteristics.

Calcinating time may be preferably 30 minutes or greater but less than 8 hours. Calcinating time less than 30 minutes produces a phosphor with poor afterglow characteristics because the reaction is incomplete. On the other hand, calcinating for 8 hours or greater does not produce appropriate results because further improvement of the afterglow characteristics is not desired.

In the present invention, $MAl_2O_4$:Eu type and $MAl_2O_4$:Eu,RE type long-lasting phosphors can be produced as described above. More specifically, they are M-(Mn)$Al_2O_4$:Eu and M-(Mn)$Al_2O_4$:Eu,RE, respectively. Particularly, M represents $Ba_sMg_tM'_u$ (0<s+t+u<1, M': Sr or Ca).

When indicated using a composition formula, they are $(M_vEu_wMn_z)Al_2O_4$ (wherein v+w+z=1, 0<v<1, w=from 0.005 to 0.08, z=from 0 to 0.09, preferably, z=from 0.001 to 0.09) and $(M_vEu_wMn_z)Al_2O_4(RE_2O_3)_r$ (wherein r=from 0 to 0.11, preferably from 0.001 to 0.11).

In the production process of the long-lasting phosphor of the present invention, the phosphor can be obtained in the form of particulates having an average particle size of from 1 μm to 1000 μm by grinding after the calcinating step or in the form of long-lasting ceramics by press forming in the stage of raw material mixing.

EXAMPLES

Examples of the present invention will hereinafter be described. It should however be borne in mind that the present invention is not limited to or by them.

Example 1

Strontium carbonate (44 g, 0.3 mol) and 2.4 g (0.04 mol) of boric acid were added to 71 g (0.1 mol) of a blue-emitting BAM phosphor ($Ba_{0.85}MgAl_{10}O_{17}Eu_{0.15}$), as determined using XRF, having an average particle size of 7 μm and collected from a waste fluorescent lamp, followed by mixing in a ball mill. The resulting mixture was calcined at 1300° C. for one hour (in a nitrogen-hydrogen atmosphere, a 97:3 percentage composition) in an alumina crucible to obtain a long-lasting phosphor. The raw material mixture before calcination had an average particle size of 4 μm.

The phosphor thus obtained had a composition of $Sr_{0.6}Ba_{0.17}Eu_{0.03}Mg_{0.20}Al_2O_4$ (in accordance with XRF: X-ray fluorescence analysis) and had a good afterglow characteristics, after 100 minutes, as high as 7.6 in comparison to the luminance of a commercially available ZnS:Cu long-lasting phosphor (Product No. GSS, product of NEMOTO & CO., LTD.) as being 1.0 (as measured using a brightness meter "Topcon BM-9"").

Example 2

Strontium carbonate (44 g, 0.3 mol), 4.7 g (0.025 mol) of dysprosium oxide, and 2.4 g (0.04 mol) of boric acid were added to 71 g (0.1 mol) of a blue-emitting BAM phosphor ($Ba_{0.85}MgAl_{10}O_{17}Eu_{0.15}$) collected from a waste fluorescent lamp, followed by mixing in a ball mill. The resulting mixture was calcined at 1300° for 1 hour (in a 97:3 nitrogen-hydrogen atmosphere) in an alumina crucible to obtain a long-lasting phosphor. The raw material mixture before calcination had an average particle size of 4 μm.

The phosphor thus obtained had a composition of $Sr_{0.6}Ba_{0.17}Eu_{0.03}Mg_{0.20}Al_2O_{4.1}Dy_{0.05}$ and had a good afterglow characteristics, after 100 minutes, as high as 18.2 in comparison to the luminance of a commercially available ZnS:Cu long-lasting phosphor as being 1.0.

Example 3

Strontium carbonate (44 g, 0.3 mol), 4.7 g (0.025 mol) of dysprosium oxide, and 2.2 g (0.04 mol) of boric acid were added to 72 g (0.1 mol) of a green-emitting BAM phosphor ($Ba_{0.8}Mg_{0.7}Mn_{0.3}Al_{10}O_{17}Eu_{0.2}$) having an average particle size of 8 μm and collected from a waste fluorescent lamp, followed by mixing in a ball mill. The resulting mixture was calcined at 1300° for 1 hour (in a 97:3 nitrogen-hydrogen atmosphere) in an alumina crucible to obtain a long-lasting phosphor. The raw material mixture before calcination had an average particle size of 5 μm.

The phosphor thus obtained had a composition of $Sr_{0.6}Ba_{0.16}Eu^{0.04}Mg_{0.14}Mn_{0.06}Al_2O_{4.1}Dy_{0.05}$ and had a good afterglow characteristics, after 100 minutes, as high as 19.6 in comparison to the luminance of a commercially available ZnS:Cu long-lasting phosphor as being 1.

Example 4

Calcium carbonate (30 g, 0.3 mol), 0.8 g (0.005 mol) of lanthanum oxide, 0.8 g (0.005 mol) of neodymium oxide, and 2.4 g (0.04 mol) of boric acid were added to 71 g (0.1 mol) of a blue-emitting BAM phosphor ($Ba_{0.85}MgAl_{10}O_{17}Eu_{0.15}$) collected from a waste fluorescent lamp, followed by mixing in a ball mill. The resulting mixture was calcined at 1300° for 1 hour (in a 97:3 nitrogen-hydrogen atmosphere) in an alumina crucible to obtain a long-lasting phosphor. The raw material mixture before calcination had an average particle size of 4 μm.

The phosphor thus obtained had a composition of $Ca_{0.6}Ba_{0.17}Eu_{0.03}Mg_{0.2}Al_2O_{4.0}La_{0.01}Nd_{0.01}$ and had a good afterglow characteristics, after 100 minutes, as high as 4.5 in comparison to the luminance of a commercially available CaSrS:Bi long-lasting phosphor (Product No: "BA-S", product of NEMOTO & CO., LTD.) as being 1.

Example 5

In a manner similar to that employed in Example 2 except that boric acid serving as a flux was not added, a long-lasting phosphor was obtained.

The phosphor thus obtained had a good afterglow characteristics, after 100 minutes, as high as 3.2 in comparison to the luminance of a commercially available ZnS:Cu long-lasting phosphor as being 1.0.

Example 6

In a manner similar to that employed in Example 2 except that the calcinating time was increased to 3 hours, a long-lasting phosphor was obtained.

The phosphor thus obtained had a good afterglow characteristics, after 100 minutes, as high as 24.8 in comparison to the luminance of a commercially available ZnS:Cu long-lasting phosphor as being 1.0.

Example 7

In a manner similar to that employed in Example 2 except that the calcination was performed in a nitrogen atmosphere, a long-lasting phosphor was obtained.

The phosphor thus obtained had a good afterglow characteristics, after 100 minutes, as high as 21.3 in comparison to the luminance of a commercially available ZnS:Cu long-lasting phosphor as being 1.0.

Example 8

In a manner similar to that employed in Example 2 except that 44 g of strontium carbonate was replaced by 31 g of strontium oxide (SrO/0.3 mol) and 4.7 g of dysprosium oxide was replaced by 6.0 g of basic dysprosium carbonate (DyO-HCO$_3$/0.025 mol), a long-lasting phosphor was obtained. The raw material mixture before calcination had an average particle size of 6 μm. The phosphor thus obtained had a good afterglow characteristics, after 100 minutes, as high as 16.5 in comparison to the luminance of a commercially available ZnS:Cu long-lasting phosphor as being 1.0.

Example 9

In a manner similar to that employed in Example 2 except that the amount of dysprosium oxide was changed from 4.7 g (0.025 mol) to 0.93 g (0.005 mol), a long-lasting phosphor was obtained.

The phosphor thus obtained had a good afterglow characteristics, after 100 minutes, as high as 13.1 in comparison to the luminance of a commercially available ZnS:Cu long-lasting phosphor as being 1.0.

Example 10

In a manner similar to that employed in Example 2 except that 4.7 g (0.025 mol) of dysprosium oxide was changed to 4.4 g (0.025 mol) of samarium oxide, a long-lasting phosphor was obtained.

The phosphor thus obtained had a good afterglow characteristics, after 100 minutes, as high as 4.1 in comparison to the luminance of a commercially available ZnS:Cu long-lasting phosphor as being 1.0.

Example 11

In a manner similar to that employed in Example 2 except that 4.7 g (0.025 mol) of dysprosium oxide was changed to 4.2 g (0.025 mol) of neodymium oxide, a long-lasting phosphor was obtained.

The phosphor thus obtained had a good afterglow characteristics, after 100 minutes, as high as 5.6 in comparison to the luminance of a commercially available ZnS:Cu long-lasting phosphor as being 1.0.

Example 12

In a manner similar to that employed in Example 4 except that 0.8 g (0.005 mol) of lanthanum oxide and 0.8 g (0.005 mol) of neodymium oxide were replaced by 1.9 g (0.01 mol) of thulium oxide, a long-lasting phosphor was obtained.

The phosphor thus obtained had a good afterglow characteristics, after 100 minutes, as high as 3.3 in comparison to the luminance of a commercially available CaSrS:Bi long-lasting phosphor as being 1.0.

Example 13

In a manner similar to that employed in Example 2 except that 44 g (0.3 mol) of strontium carbonate was replaced by 22 g (0.15 mol) of strontium carbonate and 30 g (0.15 mol) of barium carbonate, a long-lasting phosphor was obtained.

The phosphor thus obtained had a good afterglow characteristics, after 100 minutes, as high as 3.7 in comparison to the luminance of a commercially available ZnS:Cu long-lasting phosphor as being 1.0.

Comparative Example 1

Additional Test of Patent Document 1

Alumina (10.2 g, 0.2 mol), 14.5 g (0.098 mol) of strontium carbonate, 0.18 g (0.001 mol) of europium oxide, 0.19 g (0.001 mol) of dysprosium oxide, and 0.5 g (0.008 mol) of boric acid were mixed in a ball mill. The resulting mixture was calcined at 1300° C. for one hour (in a 97:3 nitrogen-hydrogen atmosphere) in an alumina crucible to obtain a long-lasting phosphor. The raw material mixture before calcination had an average particle size of 3 μm.

The phosphor thus obtained had a following composition: $Sr_{0.98}Eu_{0.01}Al_2O_{4.0}Dy_{0.01}$ and had a good afterglow characteristics, after 100 minutes, as high as 28.0 in comparison to the luminance of a commercially available ZnS:Cu long-lasting phosphor as being 1.

Comparative Example 2

In a manner similar to Comparative Example 1 except that the atmosphere upon calcination was changed to a nitrogen atmosphere, a long-lasting phosphor was obtained.

The phosphor thus obtained had an afterglow characteristic, after 100 minutes, of 14.9 in comparison to the luminance of a commercially available ZnS:Cu long-lasting phosphor as being 1.0 and thus showed a good afterglow characteristics.

Comparative Example 3

In a manner similar to Comparative Example 1 except that the calcination was performed in the air atmosphere, a long-lasting phosphor was obtained.

The phosphor thus obtained had an afterglow characteristic after 100 minutes as low as 0.1 in comparison to the luminance of the commercially available ZnS:Cu long-lasting phosphor as being 1.0 and thus showed dark.

The results described above were shown in Table 1.

TABLE 1

| | BAM phosphor | | Alkaline earth compound | | | Rare earth compound | | | Afterglow luminance (relative to commercially available product) | Remarks |
|---|---|---|---|---|---|---|---|---|---|---|
| | BAM (g) | Mol | Kind | Amount (g) | Mol | Kind | Amount (g) | Mol of @ rare earth element | | |
| Ex. 1 | 71 | 0.101 | $SrCO_3$ | 44 | 0.3 | — | — | — | 7.6 | No addition of rare earth element |
| Ex. 2 | 71 | 0.101 | $SrCO_3$ | 44 | 0.3 | $Dy_2O_3$ | 4.7 | 0.025 | 18.2 | |
| Ex. 3 | 72 | 0.101 | $SrCO_3$ | 44 | 0.3 | $Dy_2O_3$ | 4.7 | 0.025 | 19.6 | Green-emitting BAM |
| Ex. 4 | 71 | 0.101 | $CaCO_3$ | 30 | 0.3 | $La_2O_3$ + $Nd_2O_3$ | 0.8 + 0.8 | 0.01 | 4.5 | |
| Ex. 5 | 71 | 0.101 | $SrCO_3$ | 44 | 0.3 | $Dy_2O_3$ | 4.7 | 0.025 | 3.2 | Flux Free |
| Ex. 6 | 71 | 0.101 | $SrCO_3$ | 44 | 0.3 | $Dy_2O_3$ | 4.7 | 0.025 | 24.8 | Calcine for 3 hours |
| Ex. 7 | 71 | 0.101 | $SrCO_3$ | 44 | 0.3 | $Dy_2O_3$ | 4.7 | 0.025 | 21.3 | In $N_2$ atmosphere |
| Ex. 8 | 71 | 0.101 | SrO | 31 | 0.3 | $DyOHCO_3$ | 6 | 0.025 | 16.5 | |
| Ex. 9 | 71 | 0.101 | $SrCO_3$ | 44 | 0.3 | $Dy_2O_3$ | 0.93 | 0.005 | 13.1 | |
| Ex. 10 | 71 | 0.101 | $SrCO_3$ | 44 | 0.3 | $Sm_2O_3$ | 4.4 | 0.025 | 4.1 | |
| Ex. 11 | 71 | 0.101 | $SrCO_3$ | 44 | 0.3 | $Nd_2O_3$ | 4.2 | 0.025 | 5.6 | |
| Ex. 12 | 71 | 0.101 | $CaCO_3$ | 30 | 0.3 | $Tm_2O_3$ | 1.9 | 0.01 | 3.3 | |
| Ex. 13 | 71 | 0.101 | $SrCO_3$ + $BaCO_3$ | 22 + 30 | 0.3 | $Dy_2O_3$ | 4.7 | 0.025 | 3.7 | |

| | Alumina | | Alkaline earth compound | | | Rare earth compound | | | Afterglow luminance (relative to commercially available product) | Remarks |
|---|---|---|---|---|---|---|---|---|---|---|
| | Amount (g) | Mol | Kind | Amount (g) | Mol of $SrCO_3$ | Kind | Amount (g) | Total mol (as element) | | |
| Comp. Ex. 1 | 10.2 | — | $SrCO_3$ | 14.5 | 0.1 | $Eu_2O_3$ + $Dy_2O_3$ | 0.18 + 0.19 | 0.002 | 28 | Disuse of BAM phosphor |
| Comp. Ex. 2 | 10.2 | — | $SrCO_3$ | 14.5 | 0.1 | $Eu_2O_3$ + $Dy_2O_3$ | 0.18 + 0.19 | 0.002 | 14.9 | In $N_2$ atmosphere |
| Comp. Ex. 3 | 10.2 | — | $SrCO_3$ | 14.5 | 0.1 | $Eu_2O_3$ + $Dy_2O_3$ | 0.18 + 0.19 | 0.002 | 0.1 | In air atmosphere |

It has been found from Table 1 that long-lasting phosphors can be obtained in any of the alkaline earth compound or the rare earth compound by mixing a BAM phosphor with an alkaline earth compound and/or rare earth compound and then calcinating the resulting mixture so as to have afterglow luminance comparable to that of a long-lasting phosphor obtained using expensive europium as a raw material.

From Example 7 and Comparative Examples 2 and 3, it has also been found that the calcination can be conducted preferably in a reducing atmosphere or inert gas atmosphere.

The invention claimed is:

1. A process for producing an $MAl_2O_4$:Eu type long-lasting phosphor wherein M is an alkaline earth element, the process comprising mixing an alkaline earth aluminate phosphor with an alkaline earth compound and then calcinating the resulting mixture at from 1000° C. to 1500° C., wherein the alkaline earth aluminate phosphor has been separated and collected from phosphor-containing waste from recycling.

2. A process for producing an $MAl_2O_4$:Eu, RE type long-lasting phosphor wherein RE is a rare earth element, the process comprising mixing an alkaline earth aluminate phosphor with an alkaline earth compound and a rare earth compound and then calcinating the resulting mixture at from 1000° C. to 1500° C., wherein the alkaline earth aluminate phosphor has been separated and collected from phosphor-containing waste from recycling.

3. The process for producing a long-lasting phosphor according to claim 2, wherein the alkaline earth compound is strontium carbonate or calcium carbonate and the rare earth compound is dysprosium oxide or neodymium oxide.

4. The process for producing an $MAl_2O_4$:Eu type long-lasting phosphor according to claim 1, wherein the $MAl_2O_4$:Eu type long-lasting phosphor is a $Ba_sMg_tM'_uAl_2O_4$:Eu type wherein, $0<s+t+u<1$ and M' is Sr or Ca.

5. The process for producing an $MAl_2O_4$:Eu, RE type long-lasting phosphor according to claim 2, wherein the $MAl_2O_4$:Eu, RE type long-lasting phosphor is a $Ba_sMg_tM'_uAl_2O_4$:Eu,RE type wherein, $0<s+t+u<1$ and M' is Sr or Ca.

6. The process for producing an $MAl_2O_4$:Eu,RE type long-lasting phosphor according to claim 2, wherein RE is La, Nd, Sm, or Dy, or a mixture of two or more thereof.

7. The process for producing a long-lasting phosphor according to claim 1, wherein the alkaline earth compound is added in an amount of from 2 to 4 mol, per mol of the alkaline earth aluminate phosphor.

8. The process for producing a long-lasting phosphor according to claim 2, wherein the alkaline earth compound and the rare earth compound are added in an amount of from 2 to 4 mol and from 0.001 to 1 mol, respectively, per mol of the alkaline earth aluminate phosphor.

* * * * *